W. F. REUTER.
MANURE DISTRIBUTER.
APPLICATION FILED OCT. 27, 1915.

1,236,358.

Patented Aug. 7, 1917.
2 SHEETS—SHEET 1.

Witnesses
B. J. Brown
A. Ellison

Inventor
W. F. Reuter
By Chandlee & Chandlee
Attorneys

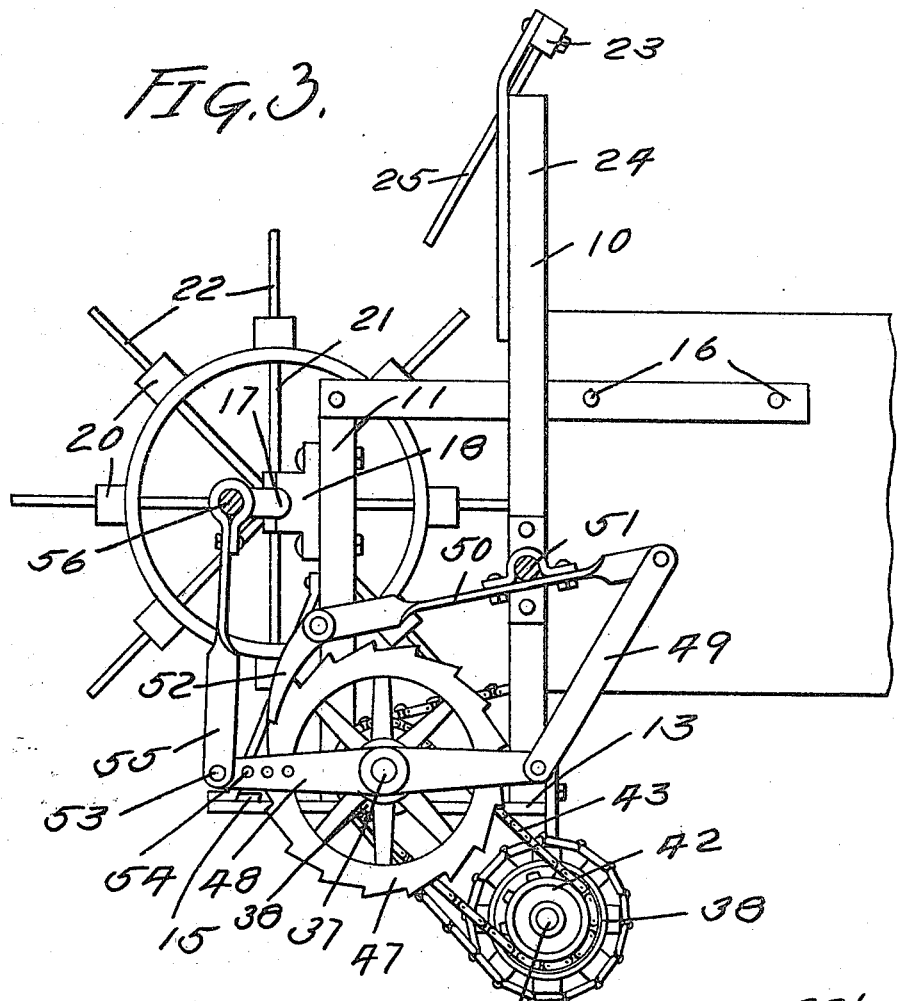

UNITED STATES PATENT OFFICE.

WILLIAM F. REUTER, OF BERLIN, NEBRASKA.

MANURE-DISTRIBUTER.

1,236,358.

Specification of Letters Patent.

Patented Aug. 7, 1917.

Application filed October 27, 1915. Serial No. 58,222.

*To all whom it may concern:*

Be it known that I, WILLIAM F. REUTER, a citizen of the United States, residing at Berlin, in the county of Otoe, State of Nebraska, have invented certain new and useful Improvements in Manure-Distributers; and I do hereby declare the following to be a full, clear, and exact description of the invention, such as will enable others skilled in the art to which it appertains to make and use the same.

This invention relates to a manure distributer which is so constructed that it may be readily attached to a farm wagon of the type used at the present time.

An object of the invention resides in the provision of a device by means of which manure may be distributed from a wagon in finely separated particles.

A further object of the invention resides in the provision of a device in which the manure will be fed to the distributing element automatically and intermittently.

A further object of the invention resides in the provision of means for rendering the distributing element and the feeding element simultaneously operative or inoperative.

A still further object of the invention resides in so constructing the device that it may be applied to a wagon in a comparatively short time.

A still further object of the invention resides in so constructing the device that the distributing element is driven directly from the rear wheels of the wagon.

A still further object of the invention resides in the provision of novel mechanism for driving the distributing element and the feeding element.

With these and other objects in view, such as will appear as my description progresses, my invention comprises the combination and arrangement of parts as set forth in and falling within the scope of the appended claims.

In the drawing:

Fig. 3 is an enlarged detail showing the intermittent actuating mechanism for the feeding element, and Fig. 4 is a detail of the lever used for throwing the device into and out of gear.

Referring to the drawing by reference characters wherein like parts are indicated by like characters throughout the several views:

Figure 1:
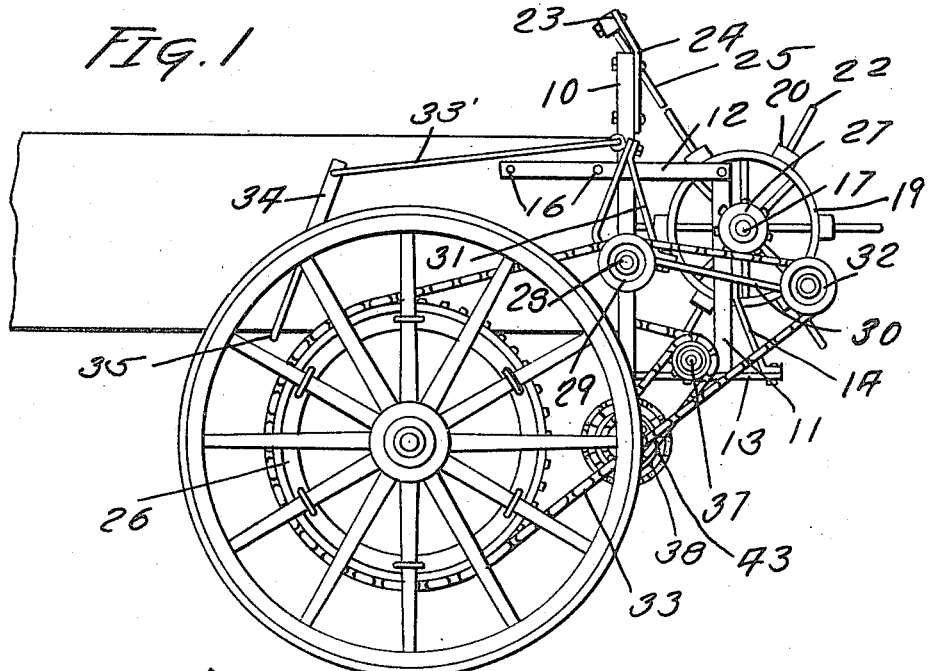
Figure 1 is a side elevation of my device showing the same attached to a wagon, only a portion of the latter being shown however.
Figure 2:
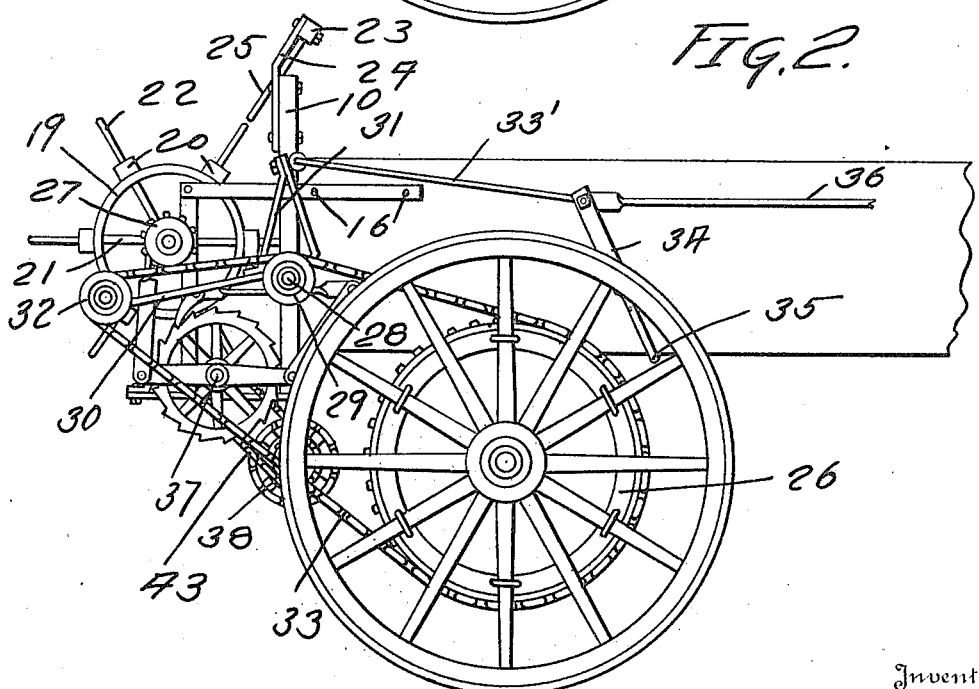
Fig. 2 is a similar view looking at the opposite side of the device.

In the embodiment of the invention shown in the drawing, I have illustrated a frame which includes vertical bars 10 and 11 and horizontal bars 12 and 13, the latter having braces 14 thereon which are secured to the vertical bars 11 and brace the same. The horizontal bars 13 are connected by a cross bar 15. This frame is adapted to be secured to a wagon body by suitable fasteners 16 and when so secured the ends of the vertical bars 10 will extend above the top of the wagon body.

A transversely extending shaft 17 is mounted in bearings 18 which are carried by the vertical bars 11 and a distributing element is secured to this shaft, which element includes a pair of spaced rings 19 between which strips 20 extend and to which the strips are secured. These rings are braced by suitable radiating spokes 21. Extending outwardly from the strips 20 are spaced fingers 22. A cross beam 23 is mounted on suitable brackets 24 on the upper ends of the bars 10 and depending from this beam in angular relation to the vertical bars 10 are a plurality of fingers 25 which are adapted to coöperate with the fingers 22 to disintegrate the manure as it is distributed.

In order that this distributing element may be driven directly from the wheels of the wagon, I have secured to each of the said wheels, a sprocket 26 and to the ends of the shaft 17, sprockets 27. A stub shaft 28 extends outwardly from each of the vertical bars 10 and is provided with a pulley 29. Mounted upon each of these shafts 28 is a bell crank lever 30, the arms being braced by a suitable strip 31. This lever has its pivotal movement about the shaft 28. Mounted on the end of each of the levers 30 is a pulley 32. Chains 33 pass over the sprockets 26 and over the pulleys 29 and 32. The pulleys 29 and 32 are so arranged that they will be located to the sides of the gears 27 and so that a straight stretch of chain passes beneath the sprockets. This stretch of chain is normally out of engagement with the sprockets 27 but it may be lifted into engagement with the sprockets by means of rods 33' which are secured to the arms 34 of a crank 35, which crank is operated by a suitable rod 36. It is obvious that when this crank is moved forwardly, the levers 30 will be moved pivotally and the chains engaged with the sprockets 27 so that the distributing element will be actuated.

In order that the manure may be fed to the distributing element I have provided a shaft 37 which extends transversely of the frame and is mounted in suitable bearings upon the horizontal bars 13. A winding drum 38 is mounted upon a shaft 39, which shaft is supported in suitable brackets 40 which depend from the frame. Secured to each end of the shaft 37 is a sprocket 41, while secured to each end of the shaft 40 is a sprocket 42. Chains 43 pass over these sprockets 41 and 42 for a purpose which will later appear. An apron is provided for moving the manure rearwardly in the wagon and this apron includes a pair of spaced chains 44 which are secured to and windable upon the drum 38. It is to be noted that the sprockets 41 are located somewhat to the rear of the forward sides of the rings 19 so that the apron must pass somewhat beneath the distributing element as it winds upon the drum. Secured to one end of the shaft 37 is a ratchet 47 and pivotally mounted upon this end of the shaft is a lever 48 with one end of which a link 49 is engaged which link extends upwardly and is pivoted to one end of a lever 50, which lever is pivoted, at 51, and is provided with a spring-pressed pawl 52. This pawl is adapted to engage the ratchet. Adjustably secured to the other end of the lever 48 by a bolt 53 which passes through any one of a series of slots 54 is a link 55. This link extends upwardly and is connected to a crank portion 56 of the shaft 17.

It will be seen that upon each revolution of the distributing element the ratchet will be given a partial rotation by the pawl 52 and will consequently partially wind the apron upon the drum 38 so that the manure will be moved intermittently toward the distributing element. Because of the fact that the drum is driven indirectly by the shaft 17, the drum will not be actuated unless the chain 33 is in engagement with the sprockets 27 and consequently the movement of the manure to the rear of the wagon will only occur when the distributing element is in operation.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. A manure distributing attachment for wagon bodies, comprising in combination, side frames adapted to be secured to the side of a wagon body, a distributing element journaled upon said frames on a line with the rear end of the body, a drum journaled in the frames below the rear end of the body, a flexible feeding device mounted in the body and windable upon said drum, a guide shaft interposed between the distributing device and the drum to guide the feeding device below the distributing device, a rockable element mounted upon each of the frames, drive chains operated between the vehicle wheels and said distributing element to rotate the latter, said drive chains passing over said rockable element to be carried into and out of connection with the distributing element, a rock lever mounted upon the axis of said guide shaft, a pitman connected to one end of said lever, a crank operated by the distributing element for actuating said pitman, a ratchet wheel also on the guide shaft, and a pawl actuated by said lever in engagement with said guide shaft, whereby the drum is operated through the medium of the guide shaft.

2. In a manure distributing attachment for wagon bodies, the combination of a distributing element, a winding drum, a flexible feeding device mounted in the wagon body and adapted to be wound upon the drum, a guide shaft interposed between the distributing element and the winding drum, a driving connection between the drum and the guide shaft, a lever carried by the guiding shaft, a ratchet wheel also carried by the guiding shaft, a driving connection between the distributing element and one end of the lever, a pivoted lever connected to the opposite end of the lever, a pawl carried by the pivoted lever and operatively engaging said ratchet wheel, and means for directly driving the distributing element from the running gear of the wheel.

In testimony whereof, I affix my signature in the presence of two witnesses.

WILLIAM F. REUTER.

Witnesses:
  S. H. BUCK,
  C. A. GANZEL.